United States Patent [19]

Bakx

[11] Patent Number: 5,072,435
[45] Date of Patent: Dec. 10, 1991

[54] INFORMATION RECORDING DEVICE WHICH ADJUSTS ITS RECORDING PARAMETERS TO THE RECORD CARRIER TO BE RECORDED

[75] Inventor: Johannes L. Bakx, Eindhoven, Netherlands

[73] Assignee: U.S. Philips Corporation, New York, N.Y.

[21] Appl. No.: 542,287

[22] Filed: Jun. 21, 1990

[30] Foreign Application Priority Data

Feb. 12, 1990 [NL] Netherlands .......................... 9000327

[51] Int. Cl.$^5$ .............................................. G11B 7/00
[52] U.S. Cl. ...................................... 369/48; 369/116
[58] Field of Search ............. 369/48, 100, 111, 245 E, 369/284, 286, 288, 116, 43

[56] References Cited

U.S. PATENT DOCUMENTS

| 4,677,606 | 6/1987 | Ogata et al. ........................... 369/48 |
| 4,717,971 | 1/1988 | Sawyer ................................. 369/34 |
| 4,943,861 | 7/1990 | Lambert ............................... 358/345 |

Primary Examiner—Robert L. Richardson
Assistant Examiner—Thai Tran
Attorney, Agent, or Firm—Leroy Eason

[57] ABSTRACT

An information recording device (FIG. 1) has write means (3, 8) for providing the record carrier (1) with information patterns (58, 59). The write means (3, 8) are adjustable. in determining the optimum adjustment a calibration procedure is carried out. For different settings of the write means (3, 8) information patterns (58, 59) are recorded. The optimum setting is determined on the basis of the recorded information patterns. The information recording device further comprises storage means for storing in a memory the determined optimum setting together with identification data which indicate for which combination of the recording device and a record carrier (1) the adjustment data has been determined. After a record carrier (1) has been loaded into the information recording device the occurrence of adjustment data for the relevant combination of a record carrier (1) and an information recording device is detected in the memory (1, 12). If adjustment data for to combination has been stored the write means (3, 8) is adjusted accordingly and no new calibration procedure is performed, saving a substantial amount of time.

4 Claims, 7 Drawing Sheets

INFORMATION RECORDING DEVICE WHICH ADJUSTS ITS RECORDING PARAMETERS TO THE RECORD CARRIER TO BE RECORDED

BACKGROUND OF THE INVENTION

This application is related to U.S. application Ser. No. 07/542,220, filed on even date herewith. The related application is entitled "Method and device for providing a record carrier with information patterns" and the inventor is the same as the applicant of the present application.

The present invention relates to an information recording device which writes on a record carrier in information patterns by being adjusted according to adjustment data on the record carrier in conformity with the determined adjustment data.

Such a device is described in European patent document EP-A-0,288,14. The device described therein employs record carriers which have been provided with adjustment data, specifically the write strategy and write intensity, during manufacture of the record carriers. After insertion of the record carrier into the information recording device, the adjustment data is read from the record carrier and the write means are adjusted in conformity with the adjustment data thus read. However, the drawback of this conventional device is that the resulting adjustment of the write means is not always found to be optimum. As a result of this, the dimensions of the recorded information patterns may exhibit deviations, so that the recorded information cannot always be read reliably.

SUMMARY OF THE INVENTION

It is an object of the present invention to provide an improved device of this type wherein the writing adjustment is more reliable. According to the invention, this object is achieved in that the means for determining the adjustment data are adapted to record test information patterns for different settings of the write means and to determine on the basis of the recorded information patterns the optimum adjustment data in accordance with a predetermined criterion, the information recording device further comprising storage means for storing in a memory the determined adjustment data together with identification data indicative of the combination of the recording device and the record carrier for which the adjustment data has been determined. The device also includes detection means for detecting, after insertion of a record carrier into the information recording device, whether adjustment data for the relevant combination of a record carrier and information recording device has been stored in the memory, the adjustment means being adapted to adjust the write means in conformity with the adjustment data in the case that adjustment data for the combination has been stored. The invention is based on inter alia the recognition of the fact that the optimum adjustment of the write means strongly depends on the record carrier used and on the information recording device used. However, for a specific combination of a record carrier and a recording device the optimum adjustment is found to remain substantially constant for the entire recording area of the record carrier. Moreover, the optimum settings are found to change hardly in the course of time.

Therefore, the determination of the adjustment data in the device in accordance with the invention remains optimum for the entire recording area of the record carrier. As a result of the storage of the adjustment data and the identification data in a memory the adjustment has to be determined only once for a specific combination of a record carrier and an information recording device, so that the time required for determining the adjustment data is also minimised.

It is possible to assign a device identification code to the information recording device and to such code on the record carrier together with the adjustment data. However, it is preferred to use an embodiment of the information recording device which stores in a memory therein the determined adjustment data together with the record carrier identification code indicative of the record carrier for which the data has been determined. Such a recording device comprises read means for reading a record carrier identification code which may be present on the record carrier, and detection means adapted to determine whether adjustment data for the record carrier identification thus read has been stored in the memory of the device. That embodiment has the advantage that the adjustment data occupies a minimal space on the record carrier. This is particularly so if the same record carrier is used in more than one recording device. In the last mentioned embodiment it is then adequate to record only a record carrier identification on the record carrier, while in the case that a device identification is recorded for each of the information recording devices a device identification and the adjustment data must be recorded on the record carrier. In principle, the record carrier identification can be applied during manufacture of the record carrier. In the case of optical record carriers this is possible in that the master employed in the fabrication of the record carriers is provided with an identification pattern. The problem which then occurs is that a complete series of the record carriers has the same record carrier identification code. Since the recording parameters of individual record carriers may vary even within the same series of record carriers, it is possible that when two record carriers of the same series are employed in the same information recording device the information patterns will not be recorded in an optimum manner for both record carriers.

An illustrative embodiment of the information recording device which mitigates this drawback is characterized in that the device provides the record carrier with a record indentification. Preferably the information recording device then comprises a random-code generator for generating the record carrier identification to be recorded. This minimizes the likelihood of the same record carrier identification being recorded in the case of mass or series produced information recording devices. Thus the likelihood of a non-optimum adjustment when the same record carrier is used in different information recording devices is minimized.

BRIEF DESCRIPTION OF THE DRAWING

Further embodiments of the recording device and the advantages thereof will now be described in more detail with reference to FIGS. 1 to 11, in which.

DETAILED DESCRIPTION OF THE PREFERRED EMBODIMENT

Figure 1:
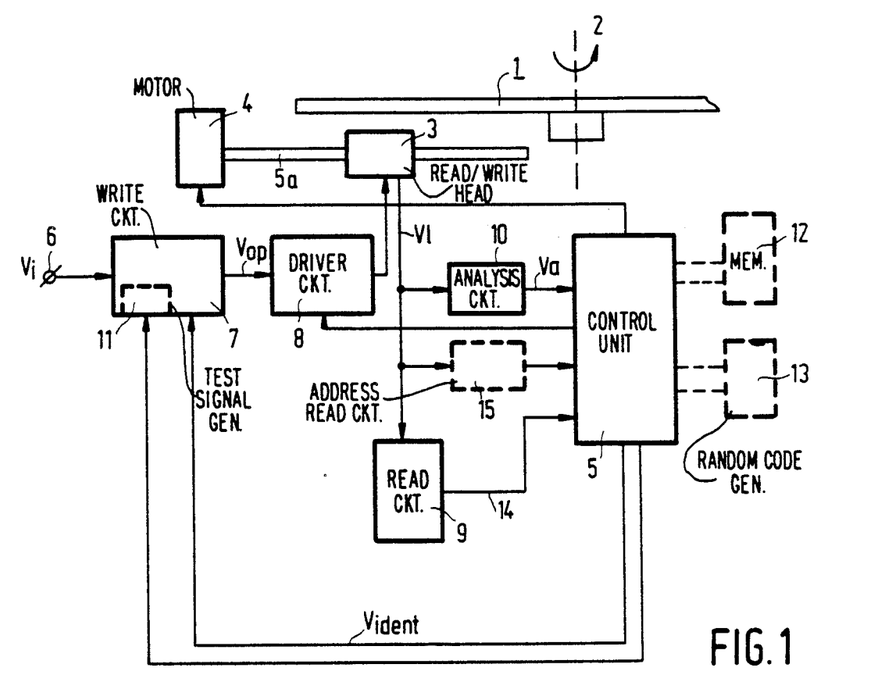
FIGS. 1 and 9 depict illustrative embodiments of the information recording device in accordance with the invention.

FIG. 1 by way of example shows an embodiment of an information recording device in accordance with the invention. The present embodiment is a recording device by means of which information can be recorded on a record carrier 1, for example an optical record carrier, which is rotated about an axis 2. The information recording device comprises a customary read/write head 3, arranged opposite the rotating record carrier 1. By means of a customary positioning system for example in the form of a motor 4 and a spindle 5a, the read-write head 3 can be moved in a radial direction relative to the record carrier 1 under control of a customary control unit 5, which comprises for example a microprocessor.

An information signal Vi to be recorded can be applied to a write signal processing circuit 7 via an input 6. The write signal processing circuit 7 is of a customary type, which converts the applied input signal into a recording signal Vop of a suitable recording format, for example a CD format. The recording signal Vop is applied to a driver circuit 8 of a customary type, which converts the recording signal Vop into a drive signal Vs for the read/write head 3 in such a way that an information pattern corresponding to the recording signal Vop is recorded on the record carrier. For the purpose of reading, the recorded information patterns the read/write head 3 has an output for supplying a read signal V1 which is representative of the information pattern being read. The read signal V1 is applied to a read circuit 9 for recovering the information represented by the read signal. The driver circuit 8 is of an adjustable type, enabling one or more of the parameter with which the quality of the recorded information pattern can be influenced to be adjusted. When an optical read/write head is used by which an information pattern of optically detectable effects is formed by means of a radiation beam, the intensity of the radiation beam is an important parameter which largely dictates the quality of the information pattern. If the read/write head is a magnetic or magneto-optical write head which generates a magnetic field for the purpose of forming an information pattern in the form of magnetic effects (domains), the field strength of the generated magnetic field may be an important adjustment parameter.

If the information pattern is formed by means of write pulses the pulse width may be an important adjustment parameter. It is to be noted that the above mentioned adjustment parameters are only few examples of the large number of adjustment parameters which are possible. In this respect reference is made in particular to Dutch Patent Document NL-A-9000150, in which the adjustment parameter is a reference value for the speed with which the effects are formed. During the formation of the effects, the intensity of the write beam is controlled to maintain the speed with which the effects are formed at the adjusted reference value.

For determining the optimum adjustment of the driver circuit 8 the device comprises an analysis circuit 10, which derives from the read signal an analysis signal which is indicative of the quality of the information pattern being read. The optimum adjustment can be determined by forming test information patterns on the record carrier 1 for different settings of the driver circuit and by selecting on the basis of the analysis signal Va that setting for which the analysis signal indicates an optimum quality. In principle, the information signal Vi may be employed for writing the test information pattern. However, it is also possible to employ a test signal generator 11 for this purpose, which may then be included, for example, in the write signal processing circuit 7. The optimum adjustment is determined under control of the control unit 5, which for this purpose is coupled to the analysis circuit 10, to the driver circuit 8, and to the test signal generator 11, if present, which control unit is loaded with a suitable program or comprises a suitable hardware circuit. Preferably, the optimum adjustment is determined in a calibration procedure, which is carried out after a record carrier has been inserted in the information recording device for the first time. The optimum adjustment data and the identification data which are indicative of the combination of a record carrier and recording device are subsequently stored. When the same record carrier is reinserted into the recording device, the stored adjustment data can then be employed again, so that it is not necessary to carry out a new calibration procedure. This saves a considerable amount of time.

With respect to the storage of adjustment data, it is to be noted that this adjustment data may be stored both on the record carrier itself and in a memory 12 of the information recording device. When the adjustment data is stored on the record carrier identification data in the form of a device identification can be recorded together with the adjustment data. After a record carrier has been loaded into the information recording device, it is then possible on the basis of the device identification recorded on the record carrier to detect unambiguously whether the adjustment data has already been determined for the relevant combination of a record carrier and an information recording device. If this is the case a calibration procedure is not necessary and the driver circuit 8 can be adjusted in conformity with the adjustment data associated with the device identification.

Although in the above method of storing the adjustment data it is always possible to determine unambiguously whether the adjustment data has already been determined in a previous calibration procedure, this method has the disadvantage that the amount of space occupied on the record carrier by the adjustment data and the device identification codes may be substantial. This is particularly so if the same record carrier is employed in a large number of information recording devices. Indeed, in that case every information recording device will record its own adjustment data and device identification code on the record carrier.

This drawback is mitigated if the record carrier is provided with a record carrier identification code and such code and the associated adjustment data are stored in the information recording device.

In principle, the record carrier can be provided with the record carrier identification code during manufacture. This has the drawback that it often allows only those methods to be used in which always complete series of record carriers are provided with the same record carrier identification code. If in such a case two or more record carriers are employed in the same information recording device, it is not unlikely that on account of the usual differences between the recording parameters of the record carriers the write circuit 8 is not optimized for all the record carriers of the same series. Therefore, it is preferred to apply the record carrier identification code by means of the first information recording device in which it is used. Preferably, the record carrier identification code to be recorded is a random generated code. This minimizes the likelihood that the same record carrier identification code is generated for different record carriers when two or more information recording devices of the same and type are used.

To determine the random record carrier identification code, the information recording device may be provided with a random code generator 13. The random code generator 13 may comprise, for example, a noise source whose output signal is sampled and is digitized by means of a digital-to-analog converter. Alternatively, the random code generator may comprise a cyclic counter which counts the pulses of a high-frequency clock signal. However, other code generators are also possible, such as for example one of a type implemented by means of software included in the software of the control unit 5.

Figure 2:
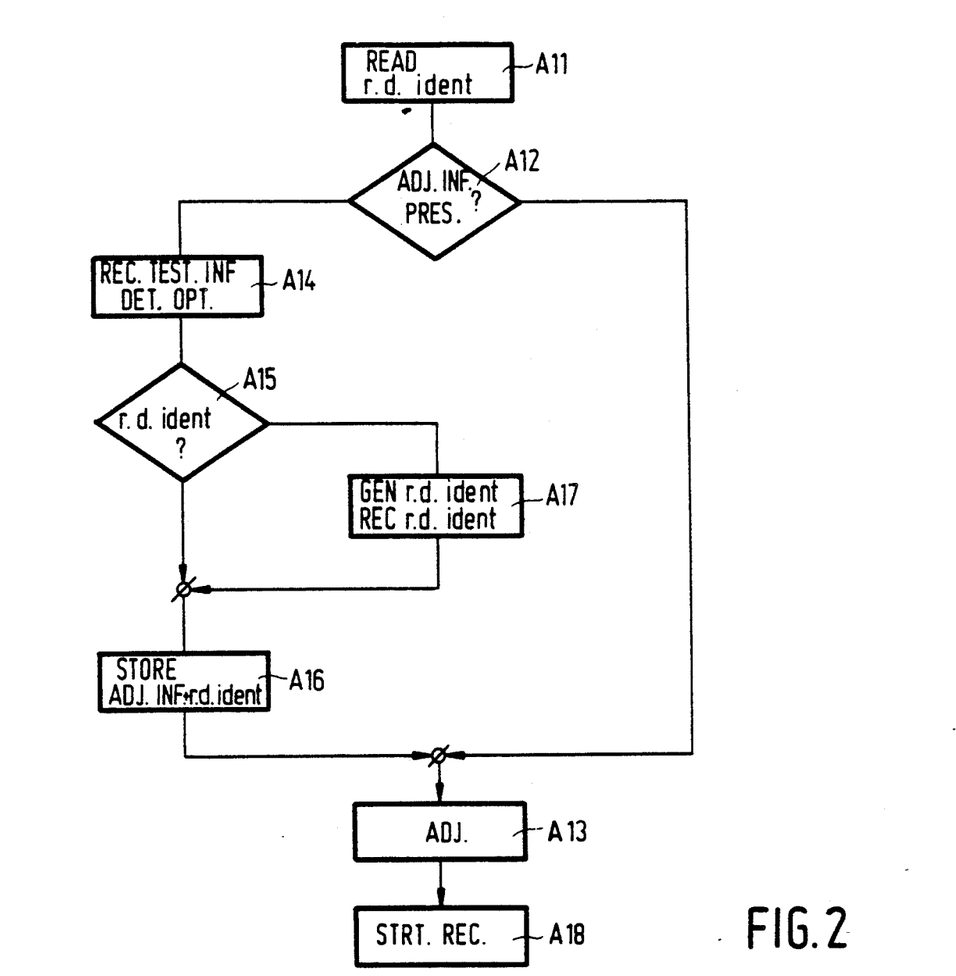
FIGS. 2 and 10 are flow charts of programs carried out by a control unit in the devices included in FIGS. 1 and 9.

FIG. 2 is a flow chart of a program for determining and storing the adjustment data in the case that the record carrier is provided with a record carrier identification, and the identification data and the associated adjustment data are stored in the memory 12 of the information recording device.

The flow chart includes an initial step A11 in which a record carrier identification which may be present on the record carrier is read under control of the control unit 5. Under control of the control unit 5, the read/write head 3 is then moved to a record carrier area intended for recording the record carrier identification code. In a step A12, it is ascertained whether adjustment data has been stored in the memory 12 for the record carrier identification read. If this is so a step A13 is carried out, in which the driver circuit 8 is adjusted in conformity with the adjustment data associated with the record carrier identification code read. If the adjustment data has not been stored, a data calibration procedure is carried out in a step A14, to determine the optimum setting. An example of the calibration procedure will be described in more detail hereinafter.

After the calibration procedure has been performed it is ascertained in a step A15 whether the record carrier 1 has already been provided with a record carrier identification code. If this is the case, the record carrier identification code together with the adjustment data is stored in the memory 12 in a step A16, for example in a table in which a plurality of combinations of record carrier identification codes and adjustment data can be stored. Subsequently, the program proceeds with the step A13 described above. If during the step A15 it is found that the record carrier 1 has not yet been provided with a record carrier identification code, a new record carrier identification code is generated by means of the random code generator 13 in a step A17. If desired, it is also checked whether this code occurs in the table in order to prevent the same record carrier identification code being assigned to two record carriers. The newly generated record carrier identification code is recorded on the record carrier at a location from which it can be retrieved. When a record carrier provided with address information is used it is possible to employ a record carrier part having a predetermined address for this purpose. However, alternatively this information may be recorded at a predetermined location on the record carrier, for example at a predetermined distance from the center of rotation of the record carrier. In the case that the information is recorded at a location having a predetermined address, the information recording device should comprise an address detection circuit 15 for reading the addresses, which circuit recovers the address information from the read signal V1 and which supplies the recovered address information to the control unit 5. During recording of the record carrier identification code, the read/write head 3 is positioned under control of the control unit 5 in a customary manner, for example on the basis of the received address information opposite the area intended for recording the record carrier identification code and, subsequently, the read/write head 3 is set to a write mode and an information signal Vident, which is representative of the record carrier identification code, is applied to an input of the write signal processing circuit 7. The write signal processing circuit 7 then converts the signal Vident into a recording signal suitable for recording and a corresponding identification pattern is recorded on the record carrier 1.

After completion of the step A17, the program advances with the steps A16 and A13 already discussed. After the step A13 recording of the signal Vi can be started under optimum conditions in a step A18.

In the foregoing, an illustrative embodiment of the information recording device has been disclosed which is suitable for recording information on a disc-shaped record carrier. However, it is to be noted that the scope of the invention is not limited to such recording devices. It may also be applied to recording devices in which the information is recorded on a tape, for example a magnetic tape.

Moreover, it is to be noted that the calibration procedure to be used for determining the optimum adjustment data depends on the recording principle employed in the information recording device. For a number of different calibration procedures suitable for use within the scope of the present invention reference is made to Netherlands Patent Applications NL-A-8901345, which corresponds to U.S. application Ser. No. 510,912 filed Apr. 18, 1990, NL-A-8901591, which corresponds to U.S. application Ser. No. 491,399 filed Mar. 8, 1990, and NL-A-900150 which may be referred to for addition information. The optimum location for recording the record carrier identification code and the form in which the identification code is recorded depend strongly on the type of the record carrier used and on the format to which the information signal is converted for the purpose of recording.

Figure 3:
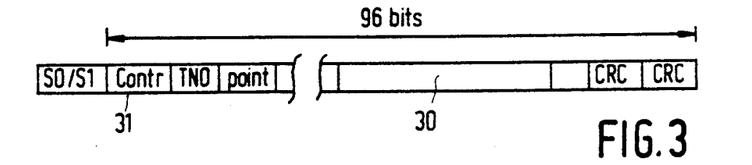
FIG. 3 shows a suitable format for recording a record carrier identification code.

In a device for recording a standard CD signal it is preferred to insert the record carrier identification code to be recorded in the subcode Q-channel of the CD signal. In that case the record carrier identification code can be extracted simply from the read signal by means of a sub code detector as customarily used in CD players. This is in contradistinction to the case in which the record carrier identification code is included in the main channel of the CD signal. In the last mentioned case determining the record carrier identification code requires additional hardware. A suitable format for including the record carrier identification code in the subcode Q-channel is shown in FIG. 3. In this format a plurality of bits 30 in a frame 31 of the subcode Q-channel serve to indicate the record carrier identification code.

Figure 4:
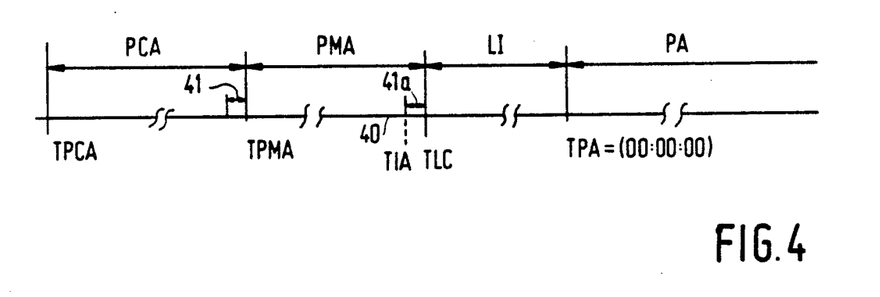
FIG. 4 depicts a suitable position for recording the record carrier identification code.

A suitable record carrier for recording standard CD signals is described in the '912 application supra and the '399 application and U.S. application Ser. No. 403,260 filed Sept. 5, 1989. Such a record carrier has a spiral servotrack which is intended for recording information. The servotrack has a track modulation, for example, a frequency modulated track wobble, representing addresses in the form of absolute time codes ATIP. The servotrack is divided into a plurality of areas as indicated in FIG. 4. In FIG. 4, the spiral track is shown diagrammatically as a straight line and bears the reference numeral 40. The servotrack 40 comprises an area PA (Program Area) intended for recording information signals, such as for example digitised audio signals, an area LI (Lead In) intended for recording a table of contents ("TOC") as prescribed by the CD standard, an area PMA which is intended for recording a temporarly table of contents as described in the 403,269 application, and an area PCA intended for recording test information patterns for the purpose of determining the optimum adjustment data. The start addresses of the areas PCA, PMA, LI and PA are designated TPCA, TPMA, TLI and TPA respectively. In the layout of the servo track 40 as shown in FIG. 4 in particular the areas PCA and PMA are suitable for recording the record carrier identification code. By way of example two suitable areas 41 and 41a are indicated in FIG. 4. Hereinafter the area 41 will be referred to as the identification area IA and the address of this area will be designated TIA. The areas 41 and 41a, which are situated outside the areas LI and PA, have a format as prescribed by the CD standard for "read-only" discs. This has the advantage that the read out of a record carrier of the inscribable type on which a standard CD signal has been recorded is not disturbed by the presence of the record carrier identification code if reading is performed by a read device intended for reading "Compact Discs" of the "read only" type.

Figure 5:
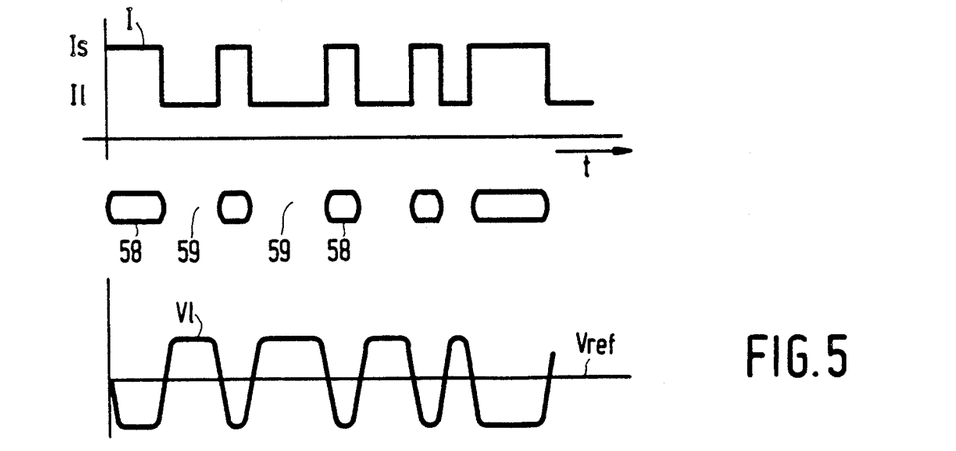
FIGS. 5, 6a–6c and 7a–7c by way of illustration demonstrate a possible calibration procedure for determining an optimum adjustment.
Figure 6A:
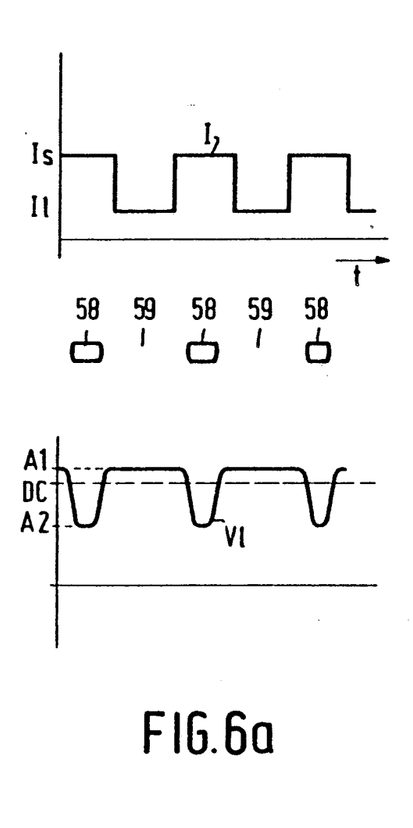
Figure 6B:
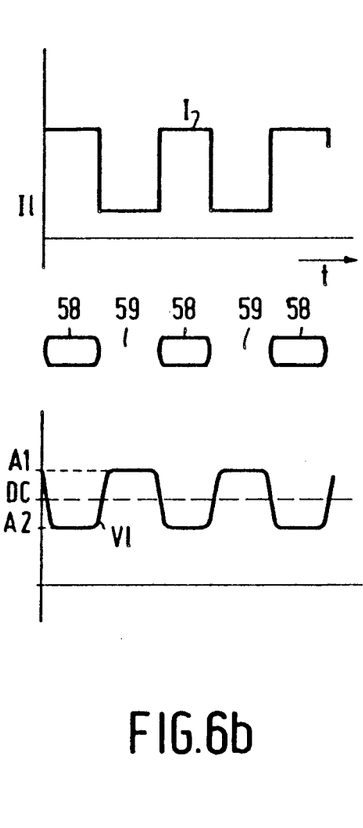
Figure 6C:
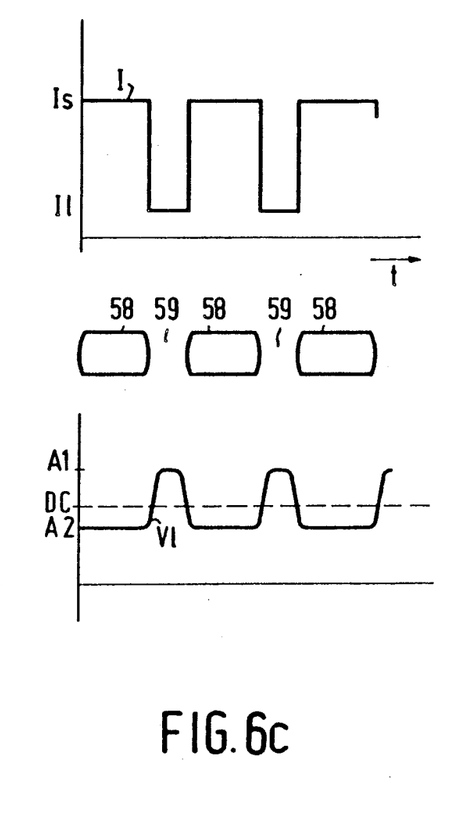

Hereinafter an illustrative embodiment of a recording device in accordance with the invention will be described, by way of example, for recording information on the optical record carrier described above. First of all a suitable method of determining the optimum adjustment data will be explained. An optically readable record carrier may be provided with an information pattern comprising effects having varying reflection properties by scanning the record carrier with a radiation beam whose intensity I is switched between a low level Il which produces no changes in reflection and a high write level Is which produces a change in reflection in the scanned part of the record carrier. An example of such an intensity variation and the associated pattern of effects 58 having changed reflection proper­ties and intermediate areas 59 having unchanged properties is given in FIG. 5. The information pattern of effects 58 and intermediate areas 59 can be read by scanning the pattern with a read beam of a constant intensity, which is low enough to preclude a detectable change in optical properties. During the scanning process, the read beam reflected from the record carrier is modulated in conformity with the information pattern being scanned. The modulation of the read beam can be detected in a customary manner by means of a radiation-sensitive detector, which generates a read signal Vl which is indicative of the beam modulation. The read signal Vl is also shown in FIG. 5. The read signal Vl is reconverted into a bivalent signal by comparison of the read signal with a reference level Vref. For a reliable conversion it is desirable that the points where the read signal Vl intersects the reference level are well defined, in other words, the "jitter" in the read signal Vl should be minimal. As is known, jitter of the read signal Vl in optimal recording is minimal if the information pattern is symmetrical, i.e. if the average length of the effects 58 is equal to the average length of the intermediate areas 59. The problem which then arises is that the length of the effects 58 strongly depends on the write intensity Is. If the write intensity is too high, the effects 58 will be too long. If the write intensity is too low, the effects 58 will be too short. Therefore, an accurate adjustment of the write intensity is required. A method of determining the optimum write intensity will be described in more detail with reference to FIG. 6. FIGS. 6a, 6b and 6c show the intensity variation I, the corresponding information pattern of effects 58 and intermediate areas 59, and the read signal Vl in the case that the write intensity Is is too low, optimum and too high respectively.

In FIG. 6, the read signals Vl vary between a maximum level A1 and a minimum level A2. The level d.c. represents the value of the DC level in the read signal Vl. As will be apparent from FIG. 6 the d.c. level DC of the read signal Vl is substantially centered between the levels A1 and A2 if the write intensity has the optimum value. If the write intensity is too low, the d.c. level DC will be situated above the middle between the levels A1 and A2, while in the case that the write level is too high, the d.c. level DC will be situated below the middle between the levels A1 and A2. Thus, an optimum write intensity can be obtained by adjusting the write intensity Is to a value for which the d.c. level DC is situated substantially in the middle between the levels A1 and A2.

Figure 7A:
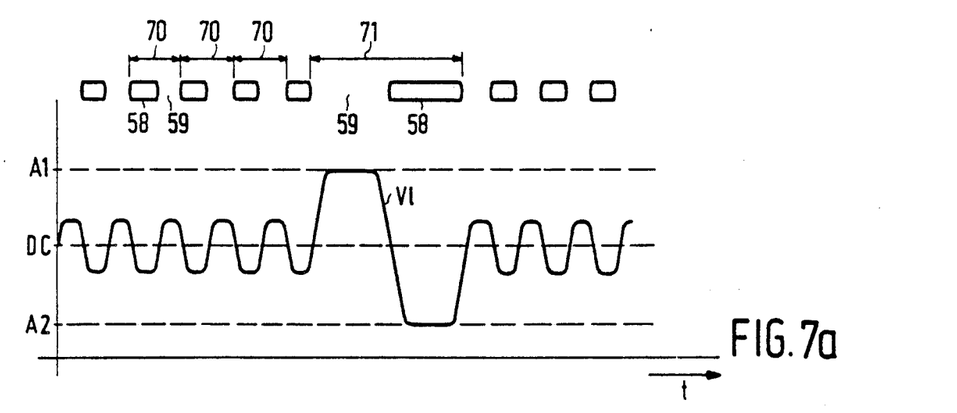

An improvement of the above method of determining the optimum intensity will be described with reference to FIG. 7a. In accordance with this method, an information pattern is recorded for the purpose of determining the optimum intensity having a plurality of sub-patterns 70 each including a short effect 58 and a short intermediate area 59, recorded by means of a write signal having a 50% duty cycle. The information pattern also has a second sub-pattern 71 including a comparatively long effect 58 and a comparatively long intermediate area 59, also recorded with the aid of a write signal having a 50% duty cycle. The number of sub-patterns 70 is selected to be substantially larger than the number of sub-patterns 71. FIG. 7a further shows the read signal V1 obtained in the case of reading with the aid of an optical read device.

The dimensions of the sub-patterns 70 are selected in such a way that the amplitude of the signal components in the read signal V1 corresponding to the sub-patterns 70 is substantially smaller than the amplitude of the signal components corresponding to the sub-patterns 71. This can be achieved by selecting the dimensions of the sub-patterns 70 in such a way that only the 1st harmonic of this pattern is situated below the optical cut-off frequency of the optical scanning device. The dimensions of the sub-pattern 71 are selected in such a way that at least the 1st and the 2nd harmonic of this pattern are situated below this optical cut-off frequency. The d.c. level DC in the read signal V1 is dicated mainly by the signal components corresponding to the sub-patterns 70. The difference between the maximum value A1 and the minimum value A2 of the read signal V1 is dictated exclusively by the value corresponding to the sub-pattern 71. As a change in write power Is has a substantially greater influence on the ratio between the lengths of the effects 58 and the intermediate areas 59 of the sub-patterns 70 than on the ratio between these lengths for the sub-patterns 71, the d.c. level DC will in the case of the method illustrated in FIG. 7a also be far more susceptible to write level variations than in the case of the method illustrated in FIG. 6, where the amplitude of the read signal V1 is the same for all the sub-patterns occurring in the information pattern. All this means that the optimum write power can be determined far more accurately by means of the method illustrated in FIG. 7a.

Figure 7B:
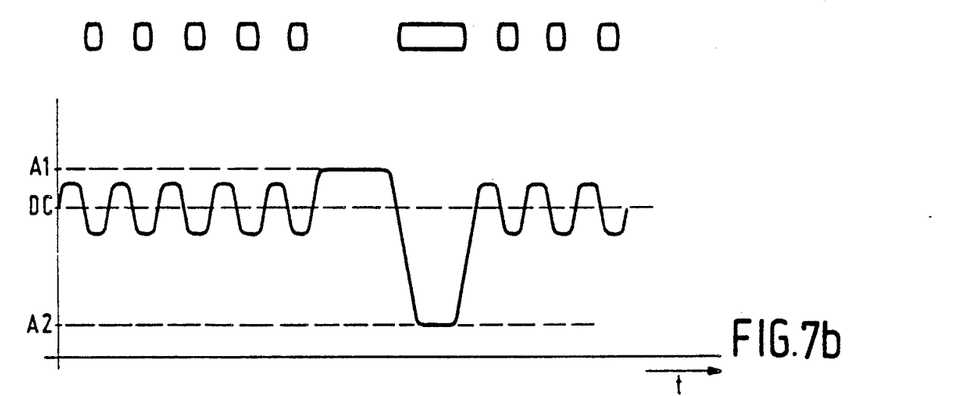
Figure 7C:
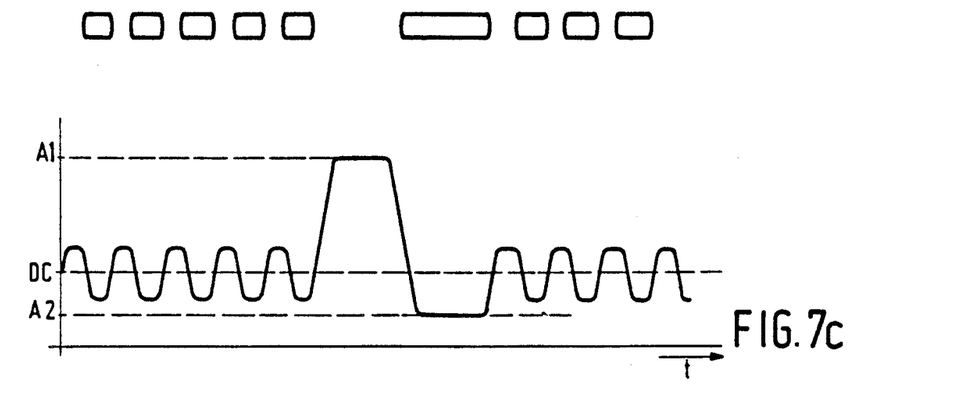

In addition to the information pattern shown in FIG. 7a, which has been recorded with an optimum write intensity, similar information patterns are shown in FIGS. 7b and 7c, which have been recorded at a write level which is too low and which is too high respectively. As will be apparent from FIG. 7, the d.c. level DC in the case of the optimum write intensity is again substantially centered between the maximum signal value (A1) and the minimum signal value (A2) in the signal V1, while in the case of a write level which is too low or too high, the d.c. level DC is situated above and below the center respectively. The information pattern shown in FIG. 7 is only one of the possible information patterns comprising a comparatively large number of sub-patterns comprising short effects and intermediate areas and a comparatively small number of sub patterns comprising long effects and intermediate areas. A sub-pattern which is also very suitable is a pattern corresponding to an EFM signal in coformity with the CD standard. Such a pattern comprises areas of a length corresponding to at least 3 bits (I3 effect) and at the most 11 bits (I11 effect). Approximately one third of all the effects in such an EFM pattern are I3 effects, whereas only 4% of all the effects are I11 effects. The dimensions of the I3 effects are such that only the fundamental of these effects is situated below the optical cut-off frequency of the optical read system. Of the I11 effects at least the 1st, the 2nd and the 3rd harmonic are situated below the optical cut-off frequency.

Figures 8, 11:
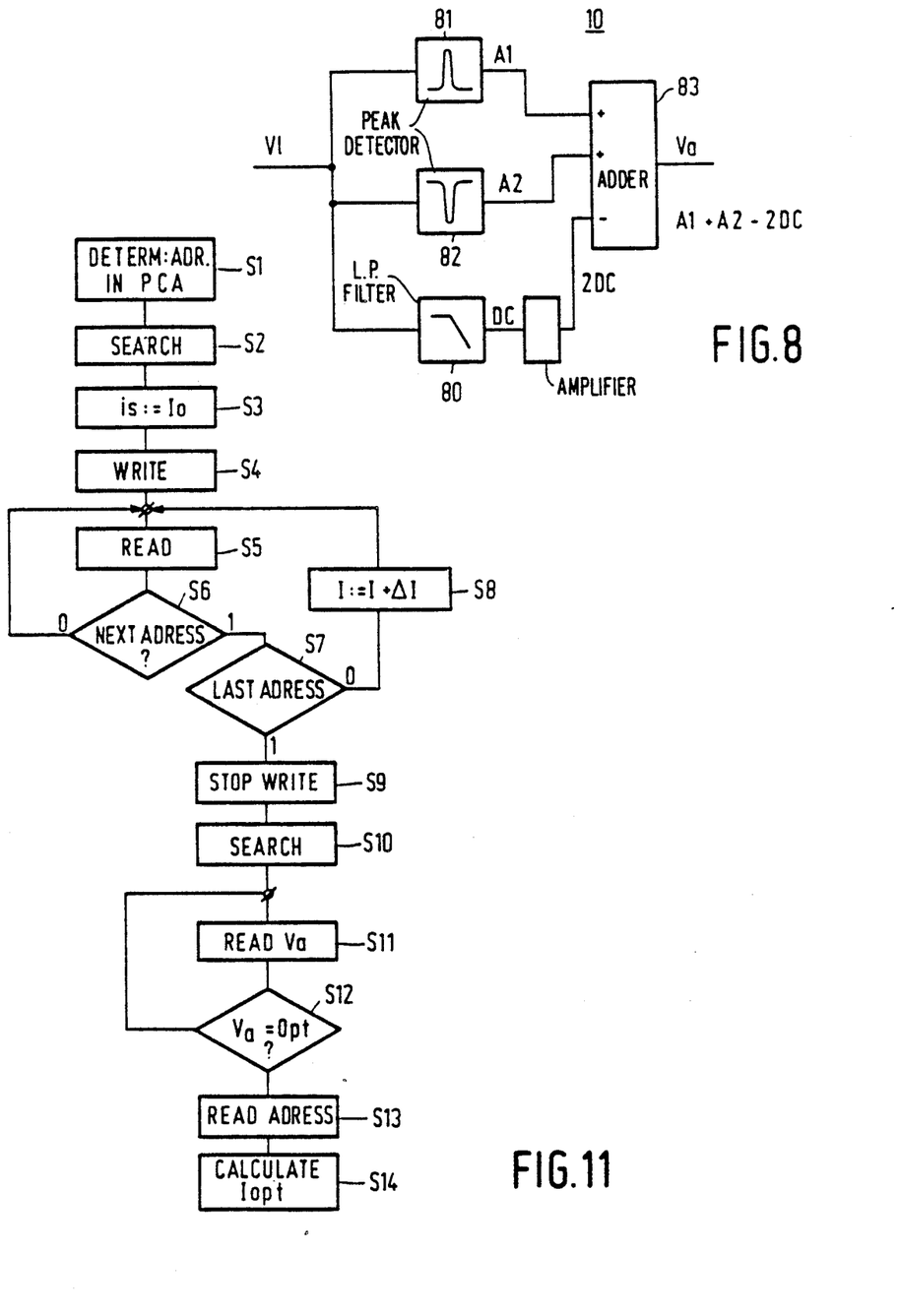
FIG. 8 provides an example of an analysis circuit for use in the information recording device.
FIG. 11 is a flow chart for a calibration program which can be carried out by the control unit for the information recording device.

FIG. 8 is an example of the analysis circuit 10 by means of which an analysis signal Va can be derived from the read signal V1 to indicate the extent to which the d.c. level DC deviates from the level corresponding to the optimum write intensity. The analysis circuit 10 in FIG. 8 comprises a low-pass filter 80 for determining the d.c. level DC in the read signal V1. The analysis circuit 10 further comprises a positive-peak detector 81 for determining the maximum value A1 in the read signal V1 and a negative-peak detector 82 for determining the minimum value A2 in the read signal V1. The output signals of the peak detectors 81 and 82 are applied to non-inverting inputs of an adder circuit 83, while the output signal of the low-pass filter 80, after amplification to twice its value, is applied to an inverting input of the adder circuit 83, so that the output signal of the adder circuit, which signal constitutes the analysis signal Va, complies with $Va = A1 + A2 - 2DC$ and consequently indicates the extent to which the signal value DC deviates from the mean value of the maximum signal value A1 and the minimum signal value A2.

For other suitable examples of analysis circuits reference is made to Dutch Patent Document NL-A-8901591.

Figure 9:
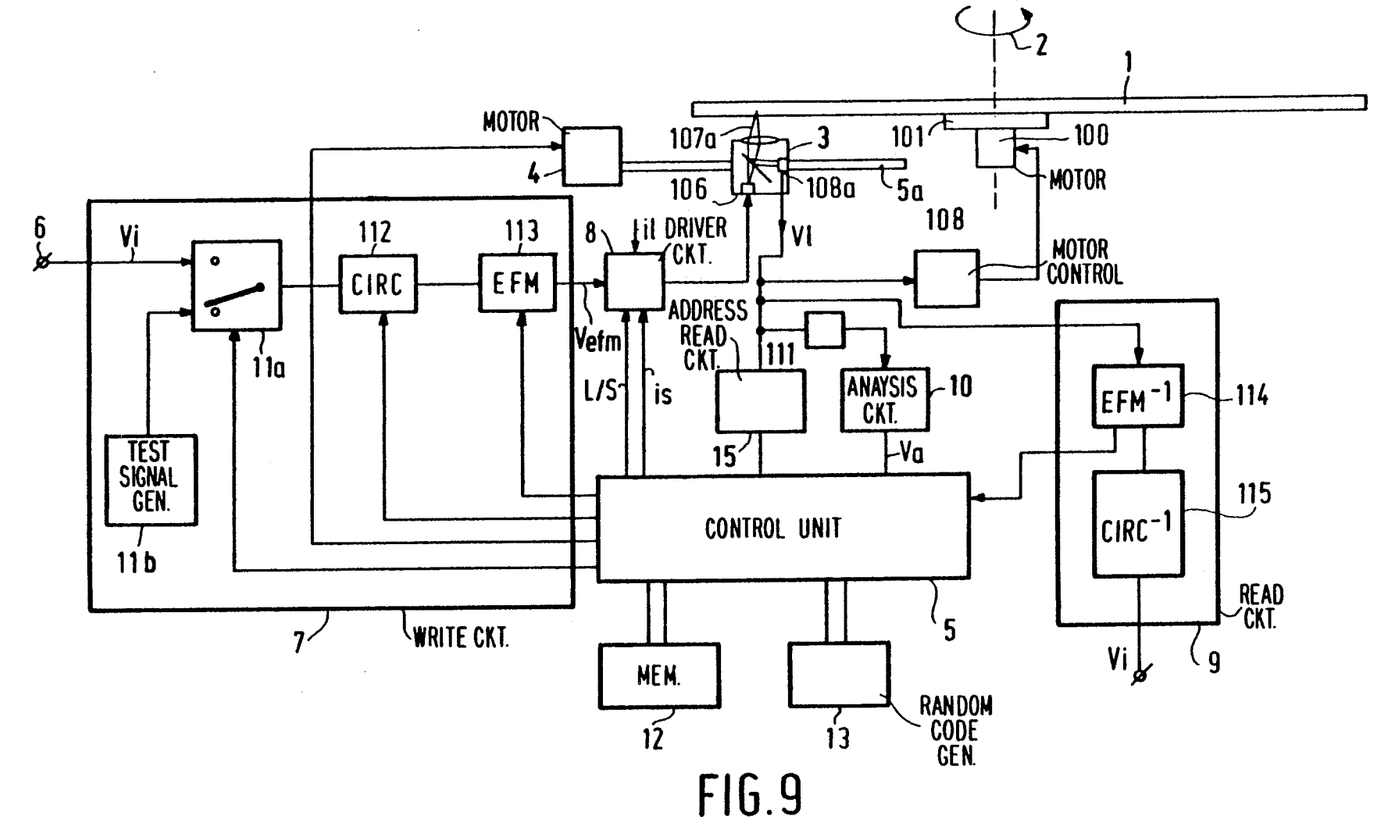

FIG. 9 shows in detail an embodiment of an information recording device for recording standard CD signals. In this Figure, elements corresponding to the elements already described in connection with FIG. 1 bear the same reference numerals. The recording device shown comprises drive means in the form of a motor 100 and a turntable 101 for rotating a radiation-sensitive record carrier 1 about the axis 2, which record carrier is of a type on which address information has been recorded as a track modulation of the servo track. The track modulation may be a track wobble, the frequency of the wobble being modulated in conformity with a position information signal comprising absolute time codes ATIP. The read/write head 3 is of a customary type comprising a semiconductor laser for generating a radiation beam 107a whose intensity is adjustable by means of the driver circuit 8. In known manner the radiation beam 107 is aimed at the servo track of the record carrier 1. The beam 107a is then reflected partly from the record carrier 1, the reflected beam being modulated in conformity with the track wobble and, if an information pattern has been recorded, also in conformity with the information pattern. The reflected beam is directed towards a radiation-sensitive detector 108a, which generates the read signal V1 corresponding to the beam modulation. The signal V1 comprises a component produced by the track wobble and having a frequency of approximately 22 kHz at the nominal scanning speed. By means of a motor control circuit 108 for controlling the motor 100, the motor speed is controlled so as to maintain the frequency of the component produced by the track wobble in the read signal V1 at substantially 22 kHz. The address detection circuit 15 is of a type which derives the time codes ATIP from the component produced in the read signal V1 by the track wobble and applies these codes to the control unit 5. Moreover, the read signal V1 is applied to an amplifier circuit 111 having a high-pass characteristic in order to reject the signal components produced in the read signal V1 by the track wobble. The read signal V1, from which the low frequency components have thus been removed, is applied to the analysis circuit 10. The signal processing circuit 7 further comprises a customary CIRC encoding circuit 112, to which the signal Vi to be recorded can be applied via a switch 11a which is controlled by the control unit 5. The CIRC encoding circuit 112 is arranged in series with a conventional EFM modulator 113 which adds the sub-code information to the main information received from the CIRC encoder 112 and subsequently converts this information into an EFM modulated signal. For the sub-code information, the EFM modulator is coupled to the control unit 5. The EFM modulator 113 has its output connected to the driver circuit 8. The driver circuit 8 is of a controllable type. Depending on the control signals received from the control unit 5, the driver circuit 8 sets the intensity of the generated beam 107a to a constant low intensity I1 or the driver circuit 8 switches the intensity of the beam between the low level I1 and the write level Is in conformity with the EFM modulated signal received from the EFM modulator 113. Moreover, the write level Is can be adjusted by the control unit 5. For the purpose of recording the test information pattern the recording device shown in FIG. 9 comprises a signal generator 11, which comprises the switch 11a and the signal generator 11b. The signal generator 11b generates a random digital signal or a signal corresponding to the digital signal value zero (digital silence). The signal generated by the signal generator 11b is applied to the CIRC encoding circuit 112 via the switch 11a. The switch 11a is of a customary type, which depending on the control signal received from the control unit 5 transfers either the signal Vi to be recorded or the output signal of the signal generator 11b.

Figure 10:
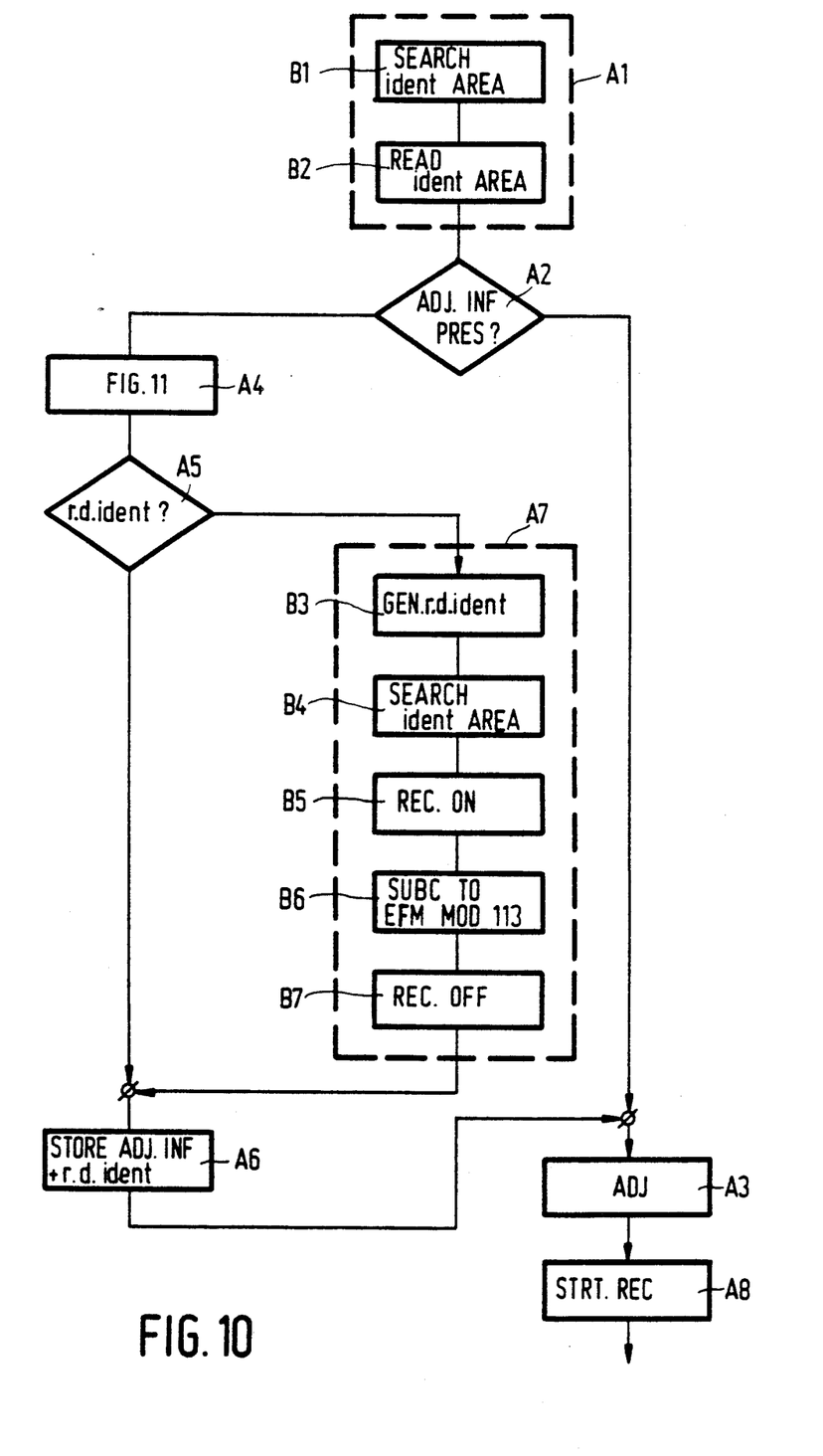

The read circuit 9 comprises an EFM demodulator 114 of a customary type, which reconverts the EFM words in the read signal V1 into information words and which separates the sub-code information from the main information. The sub-code information, in particular the sub-code Q information, is applied to the control unit 5. The main information is applied to a CIRC decoder 115 of a customary type, which recovers the original information signal Vi from the main information received from the EFM demodulator 114. For determining the write intensity setting the control unit 5 is loaded with suitable program. FIG. 10 shows a flow chart of such a program, which substantially corresponds to the flow chart shown in FIG. 2 but in which a number of steps having been divided into sub-steps. In the step A11 the record carrier identification code, if any, is read. Two sub-steps B1 and B2 are then carried out. In the step B1 the record carrier area with the start address TIA of the identification area IA is located under control of the control unit 5. Once this area is reached the control unit 5 recovers the record carrier identification code from the sub-code Q signal received from the read circuit 9. Subsequently, it is ascertained in the step A12 whether the adjustment data, specifically the optimum write-intensity setting Iopt, for this code has been stored in the memory 12. If this is the case the write intensity is set to the value Iopt under control of the control unit 5 in the step A13. If not, the optimum value Iopt for the write intensity is derived in A14 during a calibration program to be described in more detail hereinafter with reference to FIG. 11. After the step A14 it is ascertained in the step A15 whether the record carrier already has a record carrier identification code. If this is the case, the adjustment value together with the record carrier identification code is stored in the memory 12 in the step A16 and subsequently the program proceeds with the step A13.

In the other case the record carrier is provided with a record carrier identification code in the step A17. During this step the sub-steps B3 through B7 are carried out. In the step B3 a new record carrier identification code is generated by means of the random code generator 13. In the step B4 the identification area IA having the address TIA is located. Once this area is reached recording is started in the step B5 by setting the read/write head to the write mode. In the step B6 the new record carrier identification code is converted to the format required for the sub-code Q-channel and is applied to the EFM modulator 113. Preferably, a plurality of sub-code Q-frames with the record carrier identification code, for example 10, are recorded in succession, because this improves the reliability of reading the record carrier identification code at a subsequent instant. After this number of sub-code Q frames with the record carrier identification code has been recorded, the read/write head 3 is again set to the read mode in the step B7 and the program proceeds with the step A16.

FIG. 11 is a flowchart of the calibration program carried out in the step A14. In the step S1 a test area is selected within the area PCA in which the test information patterns can be recorded. The manner in which this can be effected is described in detail among other things in the afore-mentioned Dutch Patent Document NL-A-8901591. In the step S2 the selected area is located under control of the control unit 5. Once this area is reached the write intensity Is is set to the initial value Io in the step S4. Preferably, the value of Io for the relevant record carrier is prerecorded on the record carrier in a manner as described the Patent Application NL-A-8901145, which corresponds to U.S. application Ser. No. 453,545 filed Dec. 20, 1989. This value can then be read prior to the set-up cycle. Moreover, under control of the control unit 5 the signal generator 11b is connected to the CIRC encoding circuit 112 by means of the controllable switch 11a, so that an EFM modulated test signal, determined by the output signal of the signal generator, is generated by the EFM modulator 113. Finally, in the step S4 the read/write head 3 is set to the write mode, which results in a test information pattern corresponding to an EFM signal being recorded. In the step S5 the absolute time code ATIP detected by the address detection circuit 15 is read by the control unit 5. In the step S6 it is ascertained whether this absolute time code has changed relative to the previous read out. If this is not the case, the step S5 is repeated. If it has changed, it is tested in the step S7 whether the absolute time code being read indicates the end of the test area. If this is not the case the step S8 is performed, in which the write intensity Is is incremented by a small step ΔI, after which the program proceeds with the step S5. If in the step S7 it is found that the end of the test area is reached the step S9 is performed, in which the read/write head 3 is again set to the read mode. In the step S10 the beginning of the test area just described is relocated and is read. In the step S11 the analysis signal Va is read by the control unit 5. In the step S12 it is checked whether the value of the analysis signal Va corresponds to the optimum write intensity. If this is not the case, the program proceeds with the step S11. In the other case the absolute time code detected by the address detection circuit 15 is read out in the step S13. Subsequently, in the step S15, the optimum write intensity corresponding to the absolute time code read in the step S13 is computed. This is possible, for example, by determining the difference between the absolute time code last read and the time code corresponding to the beginning of the test area. By means of this difference it is possible to determine by how many steps ΔI the initial value Io has been incremented before the absolute time code ATIP last read was reached during the recording of the test information pattern. This number of steps and the initial value Io define the optimum write intensity Iopt.

It is to be noted that the calibration procedure described herein is only one of the many procedures possible for optical record carriers of this type. Another calibration procedure suitable for record carriers of this type is described in, for example, Dutch Patent Document NL-A-900150.

What is claimed is:

1. An information recording device comprising write means for recording information patterns on a record carrier, means for determining record carrier dependent adjustment data for said write means, and means for adjusting the write means in conformity with the determined adjustment data; characterized in that:

said means for determining adjustment data is adapted to cause said write means to record test information patterns on the record carrier corresponding to different settings of said write means, and to make such determination based on the recorded test information patterns and a predetermined criterion relating to such patterns;

and further characterized in that said device comprises:

memory means for storing the determined adjustment data together with identification data identifying both the recording device and the record carrier for which the adjustment data has been determined; and means for detecting, after insertion of a record carrier into the information recording device, whether there is stored in said memory means adjustment data which is applicable to the combination of the inserted record carrier and the information recording device;

said adjusting means being controlled by said detecting means so that when adjustment data applicable to said combination is stored in said memory means the adjusting means adjusts said write means in conformity with such adjustment data.

2. An information recording device as claimed in claim 1, wherein said memory means comprises a memory in which said memory means is adapted to store the determined adjustment data and an identification code identifying the record carrier to which such data is applicable; said device further comprises means for reading a record carrier identification code if such a code is present on the record carrier, and said detecting means is adapted to determine whether said memory includes adjustment data for a record carrier having the identification code read by said read means.

3. An information recording device as claimed in claim 1, further comprising means for controlling said write means to record an identification code on the record carrier.

4. An information recording device as claimed in claim 3, further comprising a random noise generator for generating the record carrier identification code.

* * * * *